(12) United States Patent
Juhl

(10) Patent No.: US 9,846,078 B2
(45) Date of Patent: Dec. 19, 2017

(54) METHOD OF COMPENSATING FREQUENCY DRIFT IN AN INTERFEROMETER

(75) Inventor: Henrik Vilstrup Juhl, Roskilde (DK)

(73) Assignee: FOSS ANALYTICAL A/S, Hilleroed (DK)

( * ) Notice: Subject to any disclaimer, the term of this patent is extended or adjusted under 35 U.S.C. 154(b) by 501 days.

(21) Appl. No.: 14/345,471

(22) PCT Filed: Oct. 17, 2011

(86) PCT No.: PCT/EP2011/068117
§ 371 (c)(1),
(2), (4) Date: Mar. 18, 2014

(87) PCT Pub. No.: WO2013/056726
PCT Pub. Date: Apr. 25, 2013

(65) Prior Publication Data
US 2014/0336972 A1    Nov. 13, 2014

(51) Int. Cl.
*G01C 19/00* (2013.01)
*G01J 3/45* (2006.01)
*G01J 3/28* (2006.01)

(52) U.S. Cl.
CPC ........... *G01J 3/45* (2013.01); *G01J 2003/283* (2013.01)

(58) Field of Classification Search
CPC ............. G01N 21/255; G01J 3/28; G01J 3/45
USPC ........................................................ 702/104
See application file for complete search history.

(56) References Cited

U.S. PATENT DOCUMENTS

| | | | |
|---|---|---|---|
| 5,790,250 A * | 8/1998 | Wang | G01J 3/453 356/451 |
| 5,850,623 A * | 12/1998 | Carman, Jr. | G01J 3/28 250/252.1 |
| 5,933,792 A * | 8/1999 | Andersen | G01J 3/28 250/252.1 |

(Continued)

OTHER PUBLICATIONS

International Search Report PCT/ISA/210 for International Application No. PCT/EP2011/068117 dated Oct. 17, 2011.

(Continued)

*Primary Examiner* — Stephanie Bloss
(74) *Attorney, Agent, or Firm* — Harness, Dickey & Pierce PLC

(57) ABSTRACT

Compensating for frequency drift of a reference energy source in an FT interferometer based spectrometer instrument may include obtaining data representing a reference interferogram collected in response to a trigger signal having been generated in dependence on the emission frequency of the reference energy source, and subsequently obtaining data representing a target interferogram recorded by the FT interferometer in response to a trigger signal also having been generated in dependence on the emission frequency of the reference energy source in the same manner. The method may further include comparing the obtained data to determine a phase shift between the interferograms in a window in at least one region away from center-burst, and generating a mathematical transform dependent on the determined shift to be subsequently applied to generate data representing a frequency stabilized interferogram of an unknown sample recorded by the FT interferometer.

14 Claims, 3 Drawing Sheets

(56) References Cited

U.S. PATENT DOCUMENTS

| | | | | |
|---|---|---|---|---|
| 6,610,982 B2* | 8/2003 | Hoult | .................. | G01J 3/28 |
| | | | | 250/339.09 |
| 2001/0055118 A1* | 12/2001 | Nawracala | ................ | G01J 3/45 |
| | | | | 356/451 |
| 2003/0189709 A1* | 10/2003 | Maynard | ................. | G01J 3/453 |
| | | | | 356/451 |
| 2004/0240517 A1* | 12/2004 | Howard | ................... | G01J 3/45 |
| | | | | 374/130 |
| 2008/0290279 A1* | 11/2008 | Juhl | ........................ | G01J 3/28 |
| | | | | 250/339.08 |
| 2011/0235034 A1* | 9/2011 | Fukuda | .................... | G01J 3/02 |
| | | | | 356/319 |
| 2013/0228690 A1* | 9/2013 | Juhl | ................... | G01N 21/3577 |
| | | | | 250/341.6 |

OTHER PUBLICATIONS

International Written Opinion PCT/ISA/237 for International Application No. PCT/EP2011/068117 dated Oct. 17, 2011.

* cited by examiner

METHOD OF COMPENSATING FREQUENCY DRIFT IN AN INTERFEROMETER

CROSS-REFERENCE TO RELATED APPLICATIONS

This application is a national phase under 35 U.S.C. §371 of PCT International Application No. PCT/EP2011/068117 which has an International filing date of Oct. 17, 2011.

BACKGROUND

Technical Field

The present invention relates to a method of compensating for frequency drift of a reference source in an interferometer employed to generate spectral data from unknown samples and to a Fourier Transform Interferometer based spectrometer instrument operating according to this method.

Related Art

Interferometric spectroscopy techniques are widely employed in the determination of chemical and compositional properties of unknown samples. Spectrometer instruments that operate according to these techniques do so generally by generating an interference pattern and detecting the effects on this pattern of an unknown sample of interest placed in the path of the interfering energy beams (or sometimes in the path of the energy beam before the interference pattern is generated). The so obtained interference data, so-called 'interferogram', observed in the time or position domain is then subjected to a numerical transformation in an arithmetic unit associated with the spectrometer instrument into information in the frequency or wavelength domain using Fourier Transformation. Such spectrometer instruments are therefore often referred to as Fourier Transform (FT) interferometers. Differences in the chemical and/or compositional properties of the unknown samples may then be correlated with the wavelength dependent intensity variations of the collected data. This is achieved typically from the application of a suitable calibration model to that data in the associated arithmetic unit.

One of the most common types of FT interferometer is the Michelson interferometer. This operates to generate the required interference pattern by separating incident energy from a probe energy source into two beams of more or less equal intensity using a beamsplitter; reflecting each of these beams from associated mirrors so as to have them recombine at the beamsplitter; moving one or both mirrors so as to create a variable path difference between the incident beams; and monitoring the interference pattern (interferogram) at a detector due to the path difference changes. By making measurements of the signal at many discrete and preferably equidistant positions of the movable mirror(s) the spectral information can then be reconstructed from the so collected interferogram by applying FT techniques in the arithmetic unit associated with the spectrometer.

As is well known for a Michelson type interferometer, the intensity of the interferogram at a particular path length difference between the two beams, so called retardation, may be expressed as a sum of cosine functions of the retardation. Each spectral element (or frequency) of the probe beam contributes to every point of the interferogram with the contribution (or weighting) of each element being unique for each point (assuming a single sided interferogram). The retardation is zero when the distance between the beamsplitter and each mirror is equal. This generates the so-called center-burst of the interferogram.

In order to reduce computational load the well known Fast Fourier Transform (FFT) technique is commonly employed in modern spectrometers employing Michelson type FT interferometers. Critical to the application of FFT techniques is the precise knowledge of the retardation at any time. In such Michelson type FT interferometers the movement of the mirror (or mirrors) is therefore precisely monitored. This is most usually done using a reference energy source which emits an essentially monochromatic radiation of known wavelength. This is typically a laser source which is configured to emit energy of known wavelength along a path through the interferometer which is substantially similar to that path traversed by the energy from the probe energy source. The resulting essentially single frequency oscillatory interference pattern that is detected by the detector is dependent on the relative position of the mirror (s) and the wavelength of the laser emission. Hence as the wavelength of the laser is, at least in theory, accurately known then the position of the moving mirror may be accurately determined or monitored. Thus, this oscillatory signal at the detector is employed to control or register the collection of the interference data at accurately known and equidistant retardation values. This may be achieved, for example, by triggering data collection at the zero amplitude crossing or with other periodically occurring features of the laser interferogram.

As can be appreciated, a variation in the emission wavelength of the laser emission between the collection of interference data at different instances for the same instrument or between different instruments will trigger data collection equidistantly but at slightly different distances. This will give rise to a phase shift in the interferograms collected at these different instances. This will manifest as a difference in the frequency or wavelength scale of the Fourier transformed collected data and ultimately to differences in the chemical and/or compositional properties of unknown samples which are to be correlated with the frequency or wavelength dependent intensity variations of the collected data in the associated arithmetic unit.

In order to mitigate this problem and correct for such phase differences caused by the reference source drift it is well known to standardize FT interferometer based spectrometers at intervals during their operational use. Typically in such a standardization event, such as is disclosed in U.S. Pat. No. 5,933,792, a measurement is made by the interferometer on a reference sample and the interferogram or Fourier transformed spectral data is compared in the arithmetic unit of the spectrometer instrument with a desired interferogram or transformed spectral data for that reference sample. The arithmetic unit then operates to generate parameters based on the comparison which describe the transition of the measurements for the reference sample to those of the desired measurements and which when applied to measurements on an unknown sample will transform those measurements to generate standardised measurements, corrected for frequency drift.

By this means information obtained for a sample using one instrument will be identical to that obtained for the same sample by any other instrument of the same type. Moreover, it is intended that such standardization will correct for the above described temporal variations in the same instrument.

Unfortunately the variations or drift in the wavelength of the reference energy, typically reference laser, source in the same instrument often occur much more frequently than the interval between standardization events for that instrument so that the above described standardization events only partially solve the problem.

This is particularly the case when solid state emission sources are used as the reference. These sources are often more susceptible to environmental variations than the helium/neon laser which has been traditionally employed as a reference. Frequent temperature drift is seen as a particular problem for these solid state sources and often relatively expensive temperature stabilization units are included in modern Michelson type FT interferometers in order to combat this.

It is an aim of the present invention to combat frequency drift In FT interferometers without the need for accurate temperature stabilization of the reference source.

According to the present invention there is provided a method of compensating for frequency drift in an FT interferometer based spectrometer instrument comprising the steps of:
(a) obtaining into an arithmetic unit of the spectroscopic instrument data representing a reference interferogram collected in response to a trigger signal having been generated in dependence on the emission frequency of a reference energy source to reflect a position of a moving optical element of the interferometer; and
(b) subsequently obtaining into the arithmetic unit data representing a target interferogram recorded by the FT interferometer; characterised in that the method further comprises the steps of: (c) comparing in the arithmetic unit the data representing the reference interferogram and the data representing the target interferogram to determining a phase shift between the interferograms in at least one region away from center-burst; (d) generating in the arithmetic unit a mathematical transform dependent on the determined shift or shifts; and (e) applying the mathematical transform to control the operation of the spectrometer to generate data representing a frequency stabilized interferogram of an unknown sample recorded by the FT interferometer.

The transform may be generated to maximize a phase correlation between the reference and the target interferogram data over an interferogram region of interest.

The transform may be applied in the arithmetic unit to mathematically correct the interferogram recorded for the unknown sample Conveniently, each interferogram may be initially phase corrected to ensure that there will be zero phase shift of every contributing frequency component for each of the two interferograms at center-burst. This may, for example, be performed in the arithmetic unit by, for each of the two Fourier transformed interferograms firstly determining their associated power spectrum (being the length of the complex spectrum after the application of FFT to the interferogram), then performing a reverse Fourier transformation to generate a phase compensated interferogram for each of the two originally measured interferograms. In this manner the newly generated interferograms are such that all contributing frequencies will have a zero shift at center-burst. This advantages that any phase difference away from the center-burst is will be maximised for a given drift in reference laser frequency and that the two interferograms may be reliably phase aligned at center-burst.

Since the frequency drift will actually cause a 'stretching' of the interferogram preferably the transform Is also made dependent on a distance in the interferogram from center-burst, such as a fraction or percentage of the position of the moving optical element, where the size of the fraction or percentage is calculated from the determined shift or shifts, for example calculated as a relative shift or shifts.

BRIEF DESCRIPTION OF THE DRAWINGS

These and other advantages will become apparent from a consideration of the following exemplary embodiments of the present invention described with reference to the drawings of the accompanying figures, of which.

DETAILED DESCRIPTION

Figure 1:
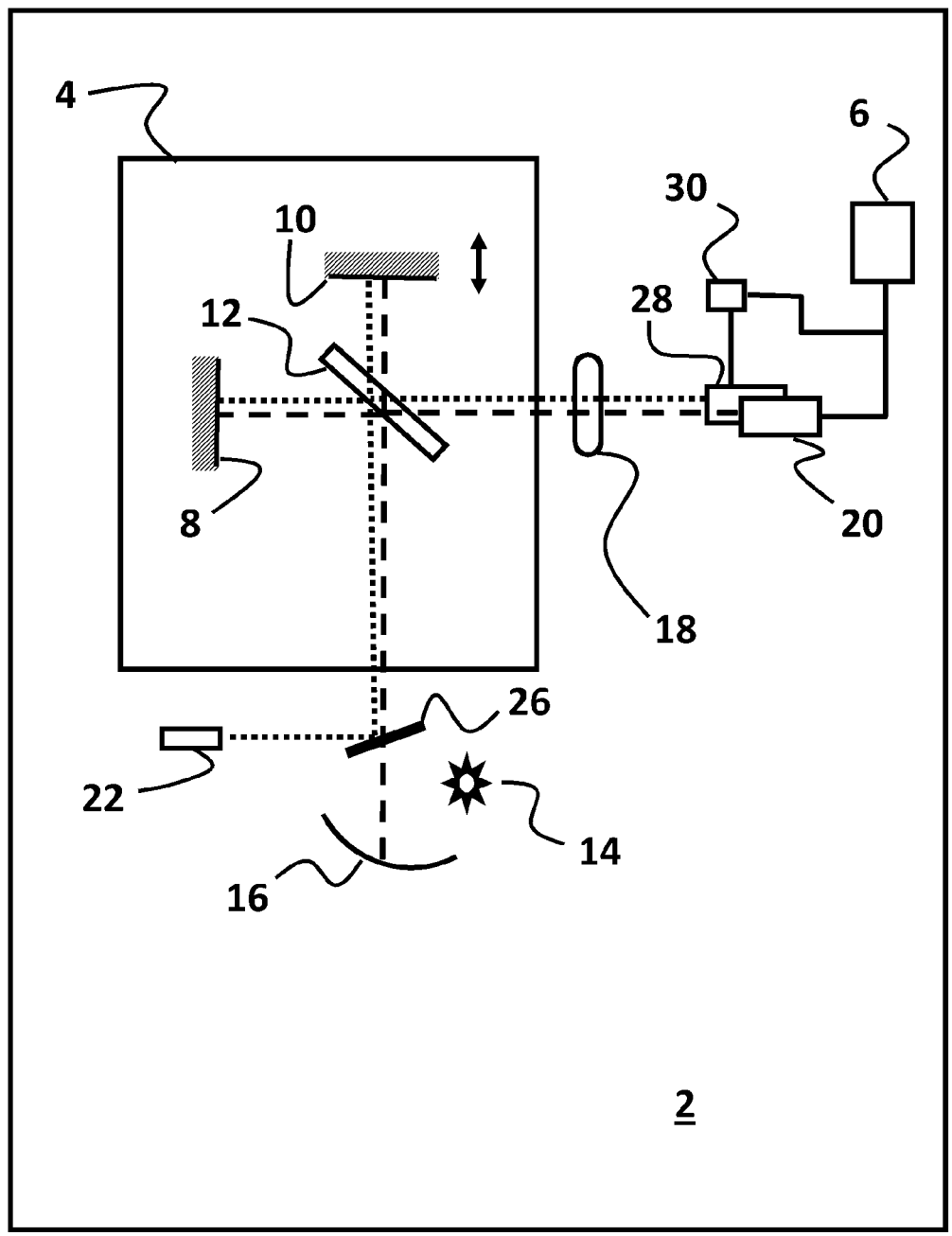
FIG. 1 shows schematically the operation of a Michelson type FT interferometer based spectrometer.

The basic structure and operation of a spectrometer comprising a Michelson type FT interferometer is discussed with reference to FIG. 1. The spectrometer 2, by way of example only, comprises a Michelson type FT interferometer 4 and an associated arithmetic unit 6, which here is formed integral with the spectrometer 2, operably connected to receive output from the interferometer 4. It will be appreciated that the arithmetic unit 6 may be alternatively be provided as a separate but connected unit sited either locally or connected to receive output from the interferometer 4 via a network (internet, LAN, WAN etc.) or indeed part of the functionality of the arithmetic unit 6 may be provided integrally, locally or remotely without departing from the invention as claimed The Michelson type FT Interferometer 4 typically comprises a stationary mirror 8, a movable mirror 10 and a beamsplitter 12 (typically also together with an associated compensator plate which for clarity is not illustrated). A radiation source 14, selected to emit radiation from within a wavelength region between ultraviolet and the infrared region of the electromagnetic spectrum, is arranged to launch radiation into the interferometer 4 via a collimator 16 and interfering radiation is directed through a sample cuvette 18 and towards an associated detector 20. In other embodiments the sample cuvette 18 may, in use, be located in the path of the collimated radiation from source 14 at a position before the beamsplitter 12 but preferably at a position such that radiation from a reference energy source, here a solid state reference laser 22, will also traverse it.

As the movable mirror 10 is reciprocally translated radiation recombining at the beamsplitter 12 after reflection from the mirrors 8 and 10 will generate an interference pattern which is detected at the detector 20 to form an interferogram recorded in the arithmetic unit 6. For each wavelength element of the radiation entering the interferometer 4 the beam components generated by the beamsplitter 12 will be completely in phase (a maximum in the interference pattern) at the beamsplitter 12 when the path length difference (retardation) between each mirror 8, 10 is equal to a whole number, n, of wavelengths and will be completely out of phase (a minimum in the interference pattern) when the path length difference between each mirror 8,10 is equal to n+½ wavelengths. Between these two extremes the signal is dependent on the cosine of the retardation.

Figure 2:
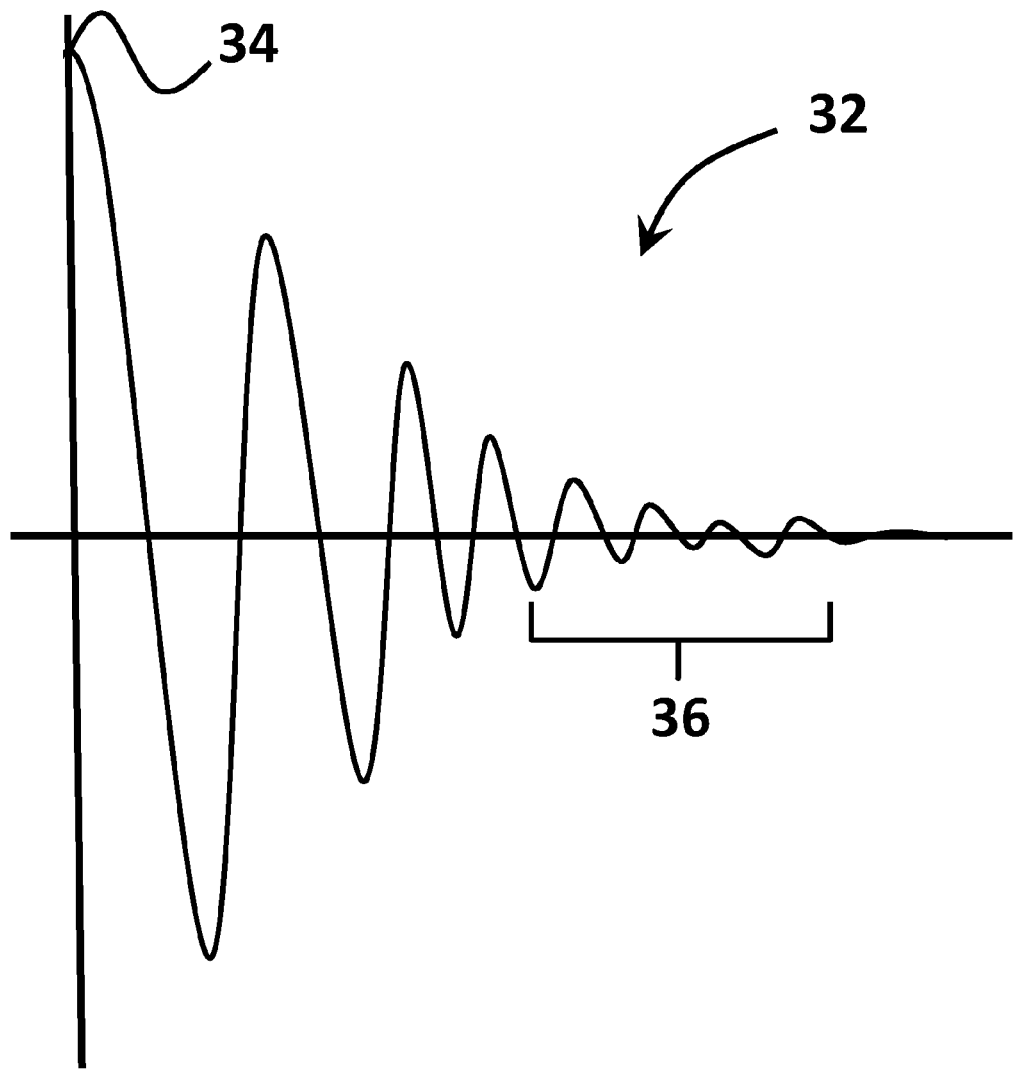
FIG. 2 is a stylized illustration of a typical interferogram obtained using the spectrometer of FIG. 1.

The interferogram stored on the computer represents the intensity of the interference pattern at discrete points or positions of the movable mirror 10. A typical interferogram 32 as may be recorded for milk is represented, for illustration only, in FIG. 2 and, as can be seen, comprises a maximum amplitude at center-burst 34 and an oscillatory amplitude portion 36 having an amplitude envelope that decreases as retardation increases. The actual frequency composition of the interferogram is dependent on the wavelengths of radiation from the source 14 that reaches the detector 20 and so is dependent on the transmission properties of any sample material that is interposed in the beam path from source 14 to detector 20.

Preferably when implementing the so called Fast Fourier Transform (FFT) analysis of the recorded interferogram the data is collected at equidistant points along the positional axis of the moving mirror 10 so that when the FFT algorithm is applied in the arithmetic unit 6 the resulting spectral data will be represented by points equidistant in frequency.

In order to obtain equidistant measurements of the interference pattern it is usual to employ an interference pattern generated using the reference source, here a solid state laser 22. Typically radiation from the laser 22 is directed into the interferometer 4, such as via a dichroic mirror 26, to follow substantially the same path through the interferometer 4 and sample cuvette 18 as the radiation from the source 14 and to be detected by an associated detector 28. In the present embodiment the output from the detector 28 is passed to a zero-crossing detector 30 which is configured to provide trigger signals as, as discussed above, the cosine variations in detected intensity crosses a zero or other threshold level. This trigger signal is then employed to trigger a recordation of a data point in the arithmetic unit 6 or it may be recorded as an index of retardation at a location in the interferogram.

Figure 3:
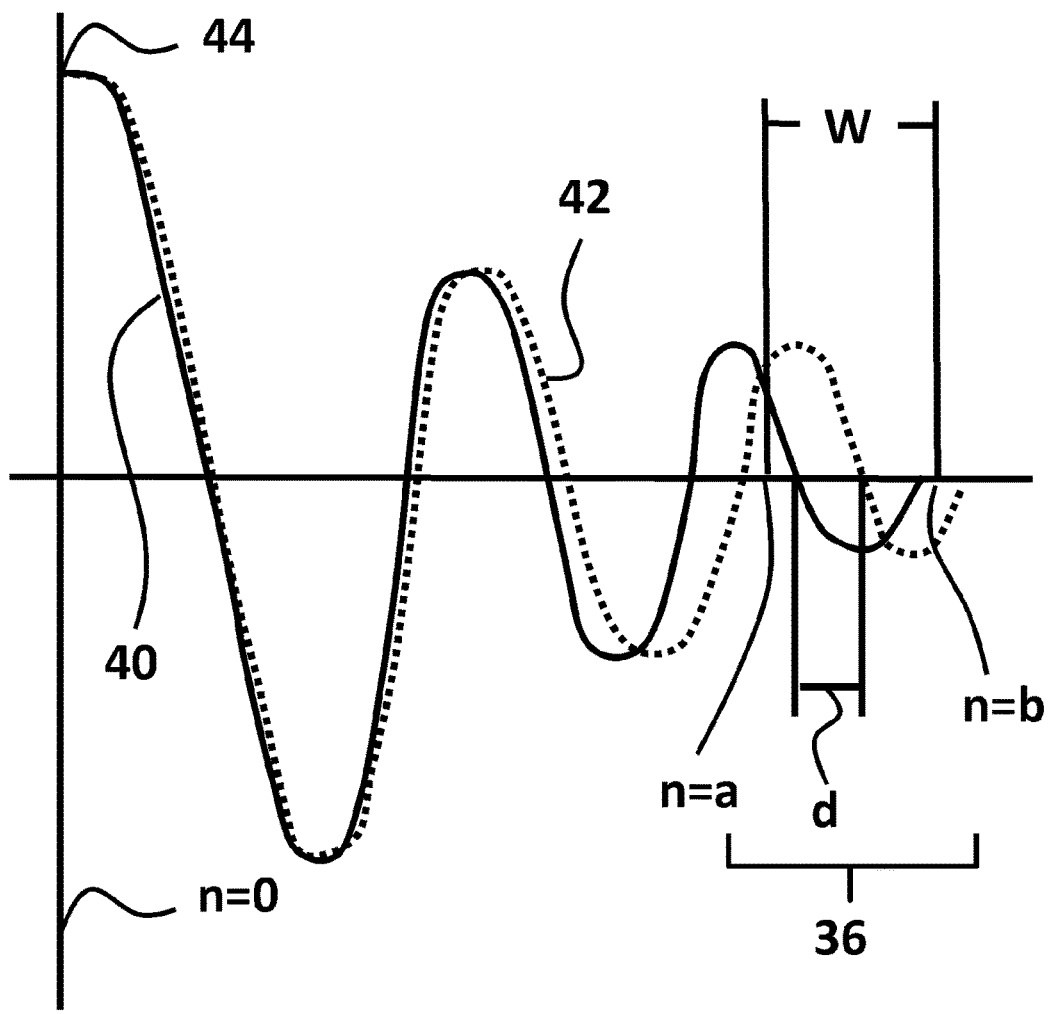
FIG. 3 is a stylized illustration of typical interferograms obtained at different times for the same sample as used in the calculation of the compensation to be applied according to the method of the present invention.

In use the spectrometer 2 according to the present invention operates, in one embodiment, as follows and with reference also to FIG. 3. Data representing a reference interferogram 40 is obtained into the spectrometer 2 and made accessible to the arithmetic unit 6. This may be a 'master' interferogram that has been collected on a same type of instrument as the actual spectrometer 2 or may have been recorded by the spectrometer 2. Data representing a target interferogram 42 is then subsequently recorded by the interferometer 4 and is made accessible to the arithmetic unit 6.

The sample in the sample cuvette 18 that is used to generate the target spectrum should be the same or sufficiently similar to that used to generate the reference interferogram to, by itself, cause insignificant phase changes to the recorded interferogram. In one embodiment the sample material used to generate the reference and the target data may be a so called zero-liquid, typically water when making measurements on milk. The use of a zero-liquid is well known in the art of FT spectrometry in order to establish a background or 'zero' level relative to which transmission intensities for spectra of unknown samples are measured. Interferograms of zero-liquid are recorded frequently, often between the recordal of successive unknown sample interferograms. Zero-liquid interferograms may therefore be advantageously employed in the method and spectrometer according to the present invention since the normal operation of the spectrometer need not be interrupted to introduce samples specifically for use in the method according to the present invention. In other embodiments unknown samples of the same basic type, for example milk samples, may be employed in the generation of the reference and the target interferogram data. This is based on the realisation that the small compositional changes in the sample material for which FT interferometer based spectrometers are typically employed to monitor have only subtle effects on recorded interferograms which normally would not introduce significant phase changes. Indeed since these compositional changes produce only subtle effects often the zero liquid and the unknown sample interferograms may be employed as the reference 40 and the target 42 interferograms.

Once data representing the reference 40 and the target 42 interferograms, in the present embodiment and by way of example only being interferograms obtained at different instances of the recordal of zero-liquid interferograms, is made accessible to the arithmetic unit 6 the arithmetic unit is configured to apply a phase correction to each of the reference 40 and the target 42 interferograms to ensure that for each of the interferograms 40, 42 all contributing frequencies will be in phase at center-burst. In one embodiment the arithmetic unit 6 is adapted to determine the power spectrum (the length of the complex spectrum after FFT). This will remove any phase difference between the frequency components that contributed to each of the recorded interferograms 40,42. The unit 6 then applies an inverse FFT to the so obtained power spectra to obtain symmetrical 'phase-corrected' reference 40 and target 42 interferograms in which each interferogram has zero phase shift of each contributing frequency at center-burst.

By way of example, the arithmetic unit 6 may be configured to store the data element representing the intensity of center-burst for each interferogram 40,42 in an associated memory location indexed n=0 and to store each consecutive data element at consecutively indexed associated memory locations. Thus the index, n, of the associated memory location will have a correspondence with the position of the moving mirror (or retardation).

The unit 6 is then operated to detect a phase shift between the phase-corrected interferograms 40, 42 in a window of width W spatially (or temporally) disposed distal of the position of the center burst 44, which center-burst Is the same for each interferogram 40,42. It will of course be recognised by the skilled person that the shift is actually a stretching of the interferogram but if determined in a relatively small window it can be described as a linear shift. It is useful but not essential that the window is located so as to measure a maximum shift with sufficient signal to noise. This can be achieved by operating the unit 6 to mathematically slide the window W along the time/distance (here x axis) of the interferogram, here by cycling through the indexes, n, of the associated memory locations in which the interferograms are stored, and measure positions (index values) along that axis of corresponding features, such as peaks, troughs or here zero-crossing positions, of the reference 40 and the target 42 interferograms and the related signal to noise ratios. Alternatively, the position of the window W may be preset. Once the location of the window W is decided, illustrated in FIG. 3 as extending from index position n=a to n=b then a shift d between the determined positions (for example index values, n) of corresponding features, here illustrated as zero crossings, can be determined mathematically, for example by simple subtraction of associated index values, and may be applied directly to control the operation of the spectrometer 2 in order to generate data representing a frequency stabilized interferogram of an unknown sample recorded by the FT interferometer 4.

In a preferred embodiment however the arithmetic unit 6 is configured to employ the so determined shift, d, in an initial transform which is then applied to the target interferogram 42. A phase correlation between the transformed target interferogram 42 and the reference interferogram 40 is then determined and the shift varied. A new transform is generated and the correlation is again measured. This may be repeated until a maximum correlation is determined. The shift at this maximum correlation, $d_{max}$, is then employed in the spectrometer 2 to control its operation in order to generate data representing a frequency stabilized interferogram of an unknown sample obtained by the FT interferometer 4.

In one embodiment the so determined transform may be employed in the arithmetic unit 6 to mathematically phase compensate the interferogram data for unknown samples that is obtained from the interferometer 4. In this embodiment the transform is applied to the so obtained data to move the entire interferogram an amount along the distance/time axis concomitant with the calculated shift $d_{max}$. In a preferred embodiment this movement is determined as a fixed percentage (or fraction), the value of which is based on the shift $d_{max}$, of the position on the interferogram of the point to be moved from center-burst 44 with index, n=0.

Zero crossings on a laser interferogram are essentially employed as a ruler to sample the interferogram at equidistant positions. Drift in the operating frequency of the reference source 22 causes this ruler is to become stretched so that the interferogram at that time will actually be sampled at different positions with respect to an earlier recorded interferogram. Preferably then, this stretching is measured as a percentage change of the distance between corresponding features of the two interferograms 40,42. As the shift is very small it may conveniently be estimated as a fixed shift 'far from the centerburst'—because here the small shifts has accumulated to a detectable shift. The detected shift, d, in the window, W, is then divided by the mean distance, using the nomenclature above may be given as (b−a)/2 of the window, W, from the centerburst (here x=0) to calculate a percentage shift d % as:

$$d\% = (d/((b-a)/2))*100 \quad (1)$$

The transform may then comprise the function $$d\%*z \quad (2)$$

where z is the memory index value, n=z, of the measured data point in the interferogram being corrected.

As discussed above d is usefully $d_{max}$, being that shift d which when applied to the target interferogram using the transform (2) above will provide a maximum correlation between the reference 40 and the target 42 interferograms.

The invention claimed is:

1. A method of compensating for frequency drift of a reference energy source in a Fourier Transform (FT) interferometer based spectrometer instrument, the method comprising:
    obtaining, by an arithmetic unit of the FT interferometer based spectrometer instrument, reference data representing a reference interferogram collected in response to a first trigger signal, the reference data representing the reference interferogram before the reference interferogram is subjected to Fourier transformation in the arithmetic unit, the first trigger signal being generated based on an emission frequency of the reference energy source and based on a first position of a moving optical element of the FT interferometer based spectrometer instrument;
    obtaining, by the arithmetic unit, target data representing a target interferogram recorded by the FT interferometer based spectrometer instrument in response to a second trigger signal, the target data representing the target interferogram before the target interferogram is subjected to Fourier transformation in the arithmetic unit, the second trigger signal being generated based on the emission frequency of the reference energy source and based on a second position of the moving optical element of the FT interferometer based spectrometer instrument;
    comparing, by the arithmetic unit, the reference data and the target data to determine at least one phase shift between the reference interferogram and the target interferogram in at least one region away from a center-burst region of the reference interferogram and the target interferogram;
    generating, by the arithmetic unit, a mathematical transform based on the determined at least one phase shift; and
    applying the mathematical transform to control the FT interferometer based spectrometer instrument to generate stabilized data representing a frequency stabilized interferogram of an unknown sample recorded by the FT interferometer based spectrometer instrument.

2. A method as claimed in claim 1, wherein the generating the mathematical transform includes generating the mathematical transform based on the determined at least one phase shift to maximize a phase correlation between the reference data and the target data throughout an interferogram region of interest.

3. A method as claimed in claim 1, wherein the generating the mathematical transform includes generating the mathematical transform as a function of the first and second positions of the moving optical element.

4. A method as claimed in claim 3, wherein the generating the mathematical transform includes generating the mathematical transform as a relative percentage shift multiplied by the function of the first and second positions of the moving optical element.

5. A method as claimed in claim 1, further comprising:
    correcting the reference data and the target data to provide phase compensated data representing the reference interferogram and the target interferogram, respectively, wherein every contributing frequency is in phase at the center-burst region, and the comparing includes comparing the phase compensated data for each of the reference interferogram and the target interferogram.

6. A Fourier transform (FT) interferometer based spectrometer instrument comprising:
    at least one movable optical element configured to introduce a path length difference between optical beams within the interferometer;
    a reference energy source configured to emit energy at a reference frequency usable to generate a trigger signal based on a position of the at least one movable optical element; and
    a cooperative arrangement of a detector and an arithmetic unit mutually configured to detect and receive interferometric data from the FT interferometer in response to the trigger signal; wherein the arithmetic unit is configured to,
        locate, in associated memory locations, reference data representing a reference interferogram and target data representing a target interferogram, and
        cause the spectrometer instrument to perform the comparing, generating, and applying operations of claim 1.

7. A method of compensating for frequency drift of a reference energy source in a spectrometer instrument, the method comprising:
    determining, by the spectrometer instrument, at least one phase shift between a reference interferogram and a target interferogram based on reference data and target data, the reference data being associated with the reference interferogram and target data being associated with the target interferogram, the reference data representing the reference interferogram before the reference interferogram is subjected to Fourier transformation in an arithmetic unit associated with the spectrometer instrument, the target data representing the target interferogram before the target interferogram is subjected to Fourier transformation in the arithmetic unit, the reference data and the target data being collected using a known sample and die reference energy source, the reference energy source being configured to emit energy of a known wavelength, the at least one phase shift being determined in at least one region away from a center-burst region;

generating, by the spectrometer instrument, a mathematical transform based on the determined at least one phase shift; and applying the generated mathematical transform to control the spectrometer instrument to generate stabilized sample data representing a frequency stabilized interferogram of an unknown sample recorded by the spectrometer instrument.

8. A method as claimed in claim 7, wherein the determining at least one phase shift includes comparing the reference interferogram and the target interferogram at one of peaks, troughs, and zero-crossing points.

9. A device comprising:
a spectrometer configured to,
determine at least one phase shift between a reference interferogram and a target interferogram based on reference data and target data, the reference data being associated with the reference interferogram and target data being associated with the target interferogram, the reference data representing the reference interferogram before the reference interferogram is subjected to Fourier transformation in an arithmetic unit associated with the spectrometer, the target data representing the target interferogram before the target interferogram is subjected to Fourier transformation in the arithmetic unit, the reference data and the target data being collected using a known sample and a reference energy source configured to emit energy of a known wavelength, the at least one phase shift being determined in at least one region away from a center-burst region of the target interferogram and the reference interferogram, generate a mathematical transform based on the determined at least one phase shift, and apply the generated mathematical transform to generate stabilized sample data representing a frequency stabilized interferogram of an unknown sample recorded by the spectrometer.

10. A device as claimed in claim 9, wherein the spectrometer is configured to generate the mathematical transform based on the determined at least one phase shift to maximize a phase correlation between the reference data and the target data throughout an interferogram region of interest.

11. A device as claimed in claim 9, wherein the spectrometer is configured to generate the mathematical transform as a function of a position of a moving optical element.

12. A device as claimed in claim 11, wherein the spectrometer is configured to generate the mathematical transform as a relative percentage shift multiplied by the function of the position of the moving optical element.

13. A device as claimed in claim 9, wherein the spectrometer is configured to correct the reference data and the target data to provide phase compensated data representing the reference interferogram and the target interferogram, respectively, wherein every contributing frequency is in phase at the center-burst region, and the determining includes comparing the phase compensated data for each of the reference interferogram and the target interferogram.

14. A device as claimed in claim 9, wherein the spectrometer is configured to determine the at least one phase shift by comparing the reference interferogram and the target interferogram at one of peaks, troughs, and zero-crossing points.

* * * * *